United States Patent
Chheda et al.

(10) Patent No.: US 7,234,083 B2
(45) Date of Patent: Jun. 19, 2007

(54) SYSTEM AND METHOD FOR TRANSFERRING INFORMATION IN A COMPUTER SYSTEM

(75) Inventors: Sachin N. Chheda, Roseville, CA (US); Gerald Everett, Alta, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 565 days.

(21) Appl. No.: 10/739,758

(22) Filed: Dec. 18, 2003

(65) Prior Publication Data

US 2005/0138472 A1   Jun. 23, 2005

(51) Int. Cl.
*G06F 11/00* (2006.01)
(52) U.S. Cl. .................. 714/47; 714/748; 714/749
(58) Field of Classification Search .................. 714/47, 714/43, 4, 748, 749
See application file for complete search history.

(56) References Cited

U.S. PATENT DOCUMENTS

| | | | |
|---|---|---|---|
| 6,108,809 A * | 8/2000 | Schwarz | 714/749 |
| 6,249,885 B1 | 6/2001 | Johnson et al. | |
| 6,349,350 B1 | 2/2002 | Hathorn et al. | |
| 6,496,890 B1 | 12/2002 | Azevedo et al. | |
| 6,543,014 B1 * | 4/2003 | Okuyama et al. | 714/712 |
| 6,658,510 B1 | 12/2003 | Bartucca | |
| 6,694,471 B1 * | 2/2004 | Sharp | 714/749 |
| 7,076,719 B2 * | 7/2006 | Anjo et al. | 714/749 |
| 2004/0064542 A1 * | 4/2004 | Williams | 709/224 |
| 2004/0064775 A1 * | 4/2004 | Gaskill et al. | 714/749 |
| 2005/0225426 A1 * | 10/2005 | Yoon et al. | 340/3.21 |

* cited by examiner

*Primary Examiner*—Marc Duncan

(57) ABSTRACT

A computer system that includes a controller that comprises a failure circuit and a management system is provided. The controller is configured to provide information to the management system at a first time, and the failure circuit is configured to cause the information to be provided to the management system at a second time in response to an acknowledgement from the management system not being receiving.

23 Claims, 5 Drawing Sheets

SYSTEM AND METHOD FOR TRANSFERRING INFORMATION IN A COMPUTER SYSTEM

BACKGROUND

One of the primary concerns of operators of computer systems is often reliability. Reliability may be particularly important in computer systems where critical applications are executed. To address reliability concerns, computer system manufacturers have developed management systems. Management systems are typically self-contained processing systems within a computer system that interact with the computer system to provide status and other types of information to an operator of the computer system.

The information provided from a computer system to a management systems may include management events. Management events may provide internal environment details, such as temperature and electrical parameters, function details, such as usage and availability logs, and diagnostic details, such as test results, to from a computer system to a management system. Management events may include relatively large amounts of information that are transferred between a computer system and a management system.

For a management system to perform its primary function, information needs to be reliably received from a computer system to allow an operator to access this information. If a management event, for example, is either not provided to a management system or is lost in the transfer between a computer system and a management system, then an agent may not be able to access the information in the management event to ensure the reliability of the computer system.

Accordingly, it would be desirable to ensure that information is properly transferred between a computer system and a management system.

SUMMARY

According to one exemplary embodiment, a computer system is provided that includes a controller that comprises a failure circuit and a management system. The controller is configured to provide information to the management system at a first time, and the failure circuit is configured to cause the information to be provided to the management system at a second time in response to an acknowledgement from the management system not being receiving.

DETAILED DESCRIPTION

In the following detailed description of the preferred embodiments, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

In one aspect of the present disclosure, a computer system provides a system and method for transferring information between the computer system and a management system coupled to the computer system. The computer system includes a controller configured to communicate with the management system. The controller includes a failure circuit and firmware that provide hardware and software mechanisms for retrying transfers of information to the management system. In response to the failure circuit detecting that an acknowledge associated with information provided to the management system has not been received, the failure circuit causes the transfer to be retried until a maximum number of retries is reached. If the maximum number of retries is reached by the failure circuit, then the firmware causes the transfer to be retried until a maximum number of firmware retries is reached.

Figure 1:
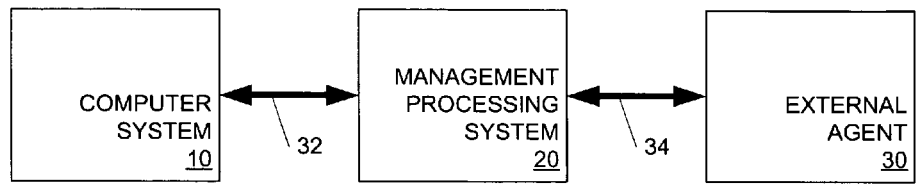
FIG. 1 is a block diagram illustrating an embodiment a system for transferring information between a computer system and a management system.

FIG. 1 is a block diagram illustrating an embodiment a system for transferring information between a computer system 10 and a management system 20. Computer system 10 communicates with management system 20 as indicated by an arrow 32 by transferring information to and receiving information from management system 20 using transactions. Computer system 10 may be any type of computer system such as a handheld, desktop, notebook, mobile, workstation, or server computer.

Management system 20 communicates with an external agent 30 as indicated by an arrow 34 by transferring information to and receiving information from agent 30 using transactions. Management system 20 is configured to execute firmware (not shown) to allow management system 20 to perform a variety of functions with respect to computer system 10. For example, management system 20 is configured to provide access to information in computer system 10 to external agent 30 using one or more communication connections (not shown) of management system 20, such as a 10/100 LAN port, a modem port, or a RS-232 console port. The information may include status information or other types of information associated with computer system 10. Management system 20 may also provide remote user 20 with access to a system console (not shown) of computer system 10. The system console may be used to control certain settings or functions of computer system 10. In addition, management system 20 may allow external agent 30 to manage computer system 10 by integrating external management applications, provide environmental health and fault management of computer system 10, provide security functions, and collaboration capabilities with other computer systems (not shown).

Figure 2:
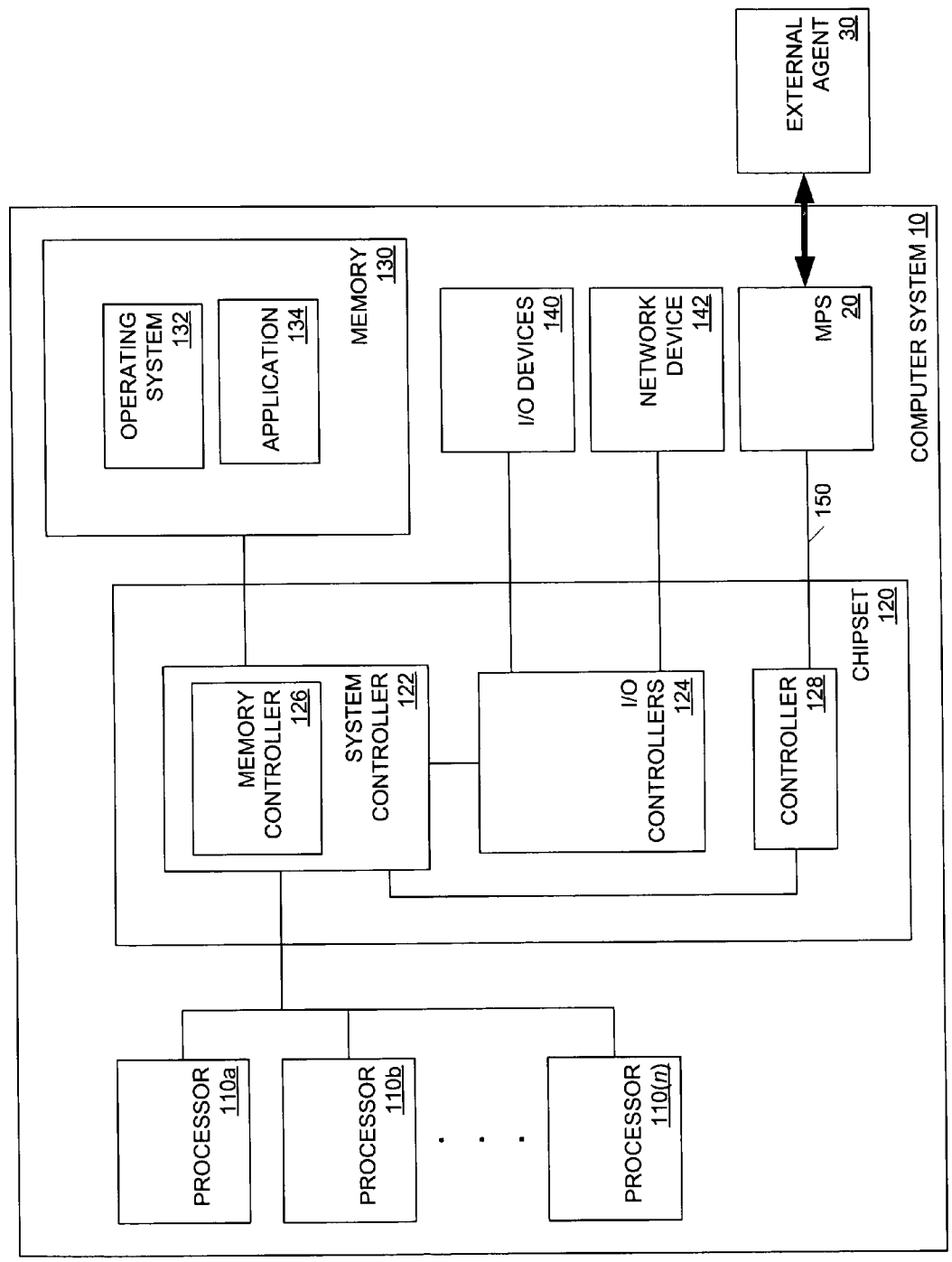
FIG. 2 is a block diagram illustrating additional details of the embodiment of FIG. 1.

FIG. 2 is a block diagram illustrating additional details of the embodiment of FIG. 1. Computer system 10 includes processors 110a through 110(n), a chipset 120, a memory 130, a set of input/output (I/O) devices 140, a network device 142, and management system 20.

Computer system 10 includes any number of processors greater than or equal to one where processor 10(n) refers to the nth processor. As used herein, 'processor 110' refers to any one of processors 110a through 110(n), and 'processors 110' refers to the set of processors 110a through 110(n). Processors 110 may include or be operable with any type or number of caches.

Computer system 10 also includes an operating system 132 and an application 134 that is executable by one or more of processors 110 using memory 130. Operating system 132 and application 134 may be stored in an I/O device 140, such as a hard disk drive, prior to being copied into memory 130 and executed by one or more processors 110. In response to being turned on or reset, one or more of processors 110 cause operating system 132 to be booted and executed. Application 134 represents any type of program executable by one or more of processors 110. Application 134 may be executed using operating system 132 or may be executed in a pre-boot environment such as the Extensible Firmware Interface (EFI) as provided by the Extensible Firmware Interface Specification, version 1.10 or any prior or subsequent versions. The Extensible Firmware Interface Specification, version 1.10 is available from Intel, 2200 Mission College Blvd., Santa Clara, Calif. 95052 USA.

Chipset 120 includes a system controller 122, a set of I/O controllers 124, and a controller 128. System controller 122 includes a memory controller 126 which is configured to store information into and read information from memory 130 in response to write and read transactions, respectively, from processors 110, I/O devices 140, network device 142, and management system 20. Memory controller 126 may include hardware and/or software configured to perform memory scrubbing or other error correction functions on memory 130 in response to reading information from memory 130.

I/O controllers 124 may include any type and number of controllers and bus bridges configured to manage one or more I/O devices 140 and network device 142. Examples of I/O controllers 124 include IDE/ATA controllers, SATA controllers, PCI controllers, SCSI controllers, USB controllers, IEEE 1394 (Firewire) controllers, PCMCIA controllers, parallel port controllers, and serial port controllers. In one embodiment, I/O controllers 124 comprise multiple microchips that include an intermediate bus coupled to system controller 122, PCI controllers coupled to the intermediate bus, and SCSI, IDE and others controllers coupled to the PCI controllers. As used herein, 'I/O controller 124' refers to a single I/O controller in I/O controllers 124, and 'I/O controllers 124' refers to the set of I/O controllers 124.

Memory 130 comprises any type of memory managed by memory controller 126 such as RAM, SRAM, DRAM, SDRAM, and DDR SDRAM. In response to commands from system firmware (not shown) or operating system 132, memory controller 126 may cause information to be loaded from an external media 148 using an I/O device 140, such as a hard drive or a CD-ROM drive, or network device 142 into memory 130.

I/O devices 140 may include any type and number of devices configured to communicate with computer system 10 using I/O controllers 124. Each I/O device 140 may be internal or external to computer system 10 and may couple to an expansion slot in a motherboard or a connector in a chassis that houses computer system 10 that is in turn coupled to an I/O controller 124. As used herein, 'I/O device 140' refers to a single I/O device in I/O devices 140, and 'I/O devices 140' refers to the set of I/O devices 140.

Network device 142 is configured to allow computer system 10 to communicate with other computer systems and storage devices (not shown) by transferring information between computer system 10 and other computer systems and storage devices.

Management system 20 is coupled to computer system 10 using a bus 150 coupled to controller 128. In one embodiment, I/O controller 124 comprises an Intel Low Pin Count (LPC) controller and bus 150 comprises a LPC bus according to the Intel Low Pin Count Interface Specification, Revision 1.1 or any prior or subsequent revisions. The Intel Low Pin Count Interface Specification, Revision 1.1, is available from Intel, 2200 Mission College Blvd., Santa Clara, Calif. 95052, USA. In other embodiments, I/O controller 128 comprises another type of controller and bus 150 comprises another type of bus.

To transfer information to management system 20, operating system 132 or application 134 causes one or more of processors 110 to provide the information to controller 128 in the form of a transaction for transfer to management system 20 using system controller 122. The transaction includes a function call along with the information. The function call may specify parameters of the transfer such as a priority, a port to use, and a number of retries to use.

Figure 3:
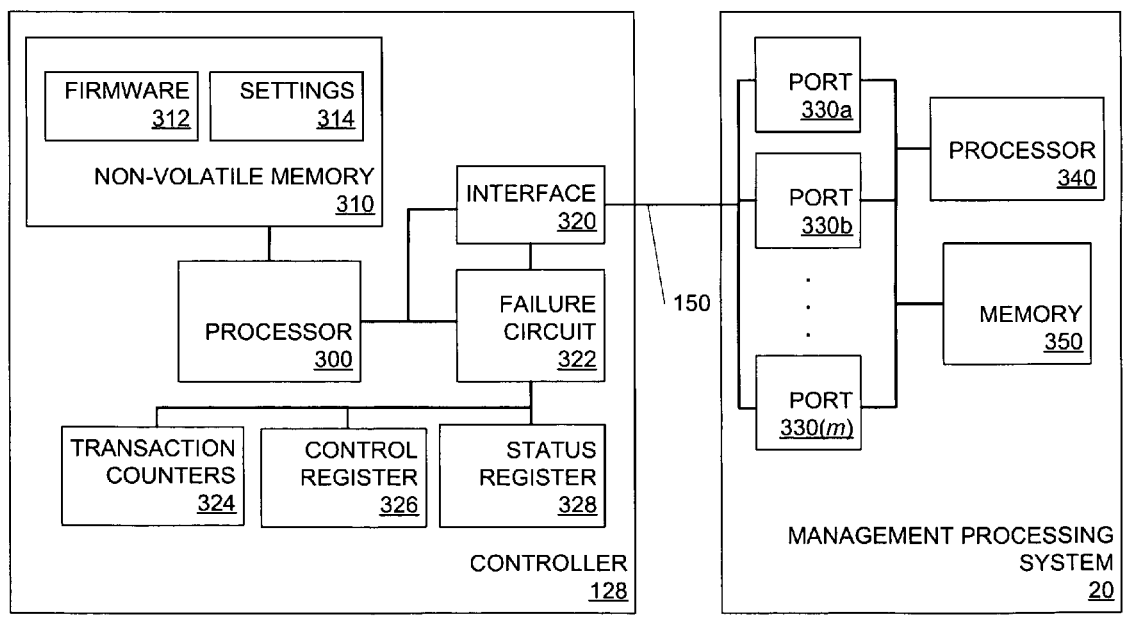
FIG. 3 is a block diagram illustrating an embodiment of a controller and a management system.

FIG. 3 is a block diagram illustrating an embodiment of controller 128 and management system 20. Controller 128 includes a processor 300, a non-volatile memory 310 such as a flash memory, an interface 320, a failure circuit 322, transaction counters 324, a control register 326, and a status register. Management system 20 includes a set of ports 330a through 330(m), a processor 340, and a memory 350. Management system 20 includes any number of ports greater than or equal to one where port 330(m) refers to the mth port. As used herein, 'port 330' refers to any one of ports 330a through 330(m), and 'ports 330' refers to the set of ports 330a through 330(m). Ports 330 may each be the same type of port or may include any number of different types of ports. The operation of controller 128 will now be described with reference to FIG. 4.

In the operation of controller 128, processor 300 executes firmware 312 according to settings 314. Controller 128 receives information from computer system 10 and provides the information to management system 20 using interface 320. Controller 128 also receives information from management system 20 and provides the information to computer system 10 using interface 320. Failure circuit 322 monitors the transfer of information and intervenes in response to management system 20 failing to acknowledge receipt of information from controller 128.

Transaction counters 324 comprise a counter for each port 330 in management system 20 to store a value that indicates the number of times a transaction has been provided to a port 330.

Control register 326 comprises a retry indicator, a maximum number of retries indicator, and one or more port indicators. The values in control register 326 may be set by firmware 312 in response to initiating a transaction. The retry indicator indicates whether a transaction should be retried or aborted, the maximum number of retries indicator is a value that indicates a number of times that the transaction should be retried, and the port indicators are values that indicate one or more ports to be used for the transaction.

Status register 328 comprises a success/failure indicator and a number of retries indicator. The success/failure indicator is a value that indicates whether a transaction succeeded or failed, and the number of retries indicator is a value that indicates a number of times that the transaction was retried.

In the operation of management system 20, processor 400 executes firmware (not shown) of other programs. Management system 20 receives information from controller 128 and provides information to controller 128 using ports 330.

Figure 4:
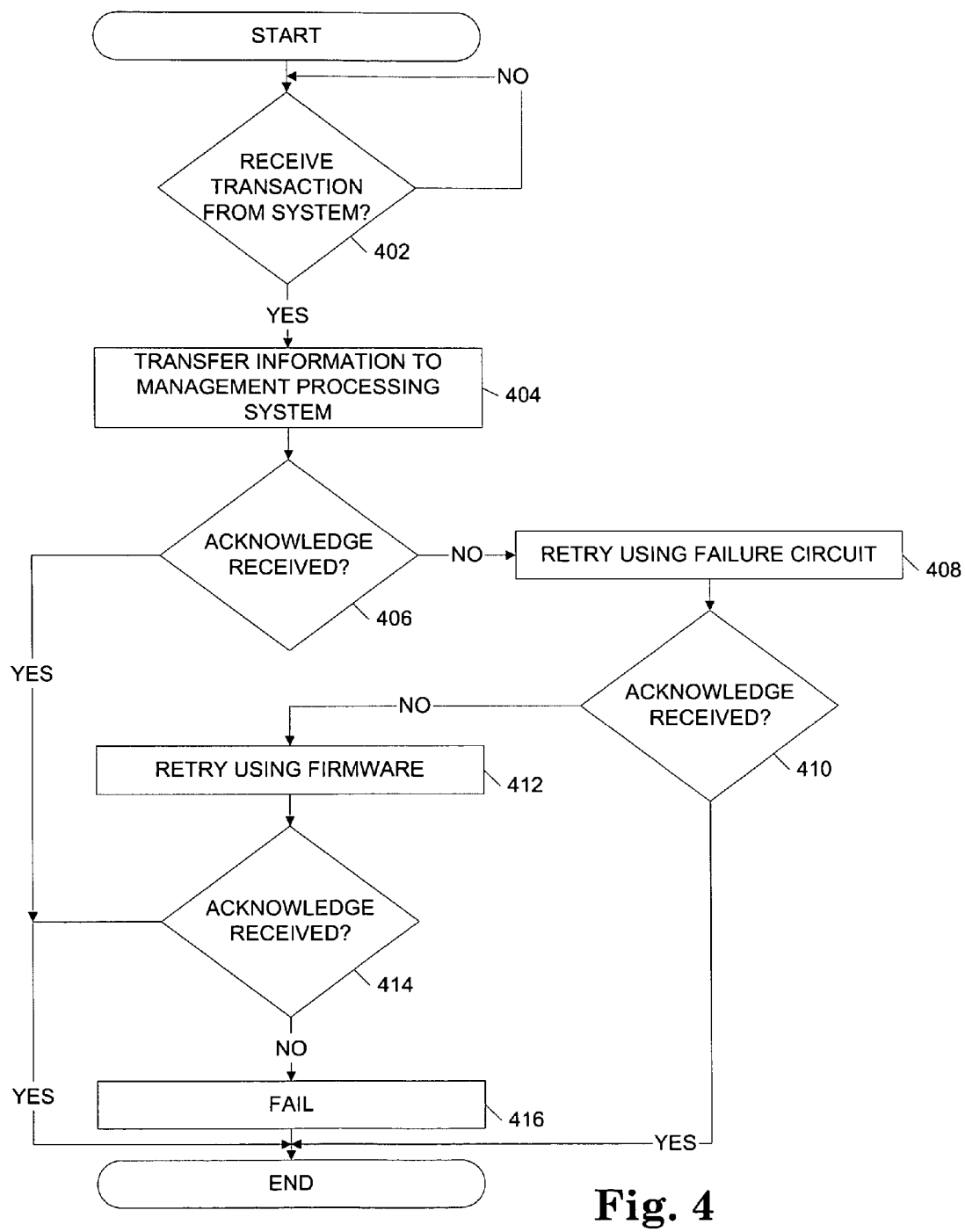
FIG. 4 is a flow chart illustrating an embodiment of a method for transferring information to a management system.

FIG. 4 is a flow chart illustrating an embodiment of a method for transferring information to management system 20. In FIG. 4, a determination is made by controller 128 as to whether a transaction has been received from computer system 10 as indicated in a block 402. If a transaction has not been received from computer system 10, then the function of block 402 is repeated at a later time.

If a transaction has been received from computer system 10, then controller 128 causes information associated with the transaction to be transferred to management system 20 as indicated in a block 404. As noted above, the transaction provided by computer system 10 includes a function call and the information. The function call is associated with a function in firmware 312 and may also be associated with a particular port 330 in management system 20. In response to receiving the function call, controller 128 causes the function in firmware 312 to be executed by processor 300. The function is configured to cause processor 300 to provide the information to management system 20 using interface 320 and a port 330.

A determination is made by controller 128 as to whether an acknowledge associated with the information has been received across interface 320 by controller 128 as indicated in a block 406. If the acknowledge has been received, then the transfer is considered a success and controller 128 may update status information in status register 328 accordingly.

If an acknowledge associated with the information has not been received, then controller 128 causes the transfer to be retried using failure circuit 322 as indicated in a block 408. As described in additional detail with reference to FIG. 6 below, failure circuit 322 causes the transfer to be retried according to failure information stored in transaction counters 324, control register 326, and status register 328. The function of block 408 may be repeated until a maximum number of retries is reached.

A determination is made by controller 128 as to whether an acknowledge associated with the information has been received across interface 320 by controller 128 as indicated in a block 410. Controller 128 may make this determination in response to a signal from failure circuit 322 or in response to detecting that failure circuit 322 has reached a maximum number of retries. If the acknowledge has been received, then the transfer is considered a success and controller 128 may update status information in status register 328 to indicate the success and the number of retries performed by failure circuit 322.

If an acknowledge associated with the information has not been received, then controller 128 causes the transfer to be retried using firmware 312 as indicated in a block 412. As described in additional detail with reference to FIG. 5 below, firmware 312 causes the transfer to be retried. Firmware 312 may cause the information to be provided to one or more different ports 330 in management system 20 and may use failure information stored in transaction counters 324, control register 326, and status register 328. The function of block 412 may be repeated until a maximum number of retries is reached on any number of ports 330.

A determination is made by controller 128 as to whether an acknowledge associated with the information has been received across interface 320 by controller 128 as indicated in a block 414. Controller 128 may make this determination in response to a signal from firmware 312 or in response to detecting that firmware 312 has reached a maximum number of retries on one or more ports 330. If the acknowledge has been received, then the transfer is considered a success and controller 128 may update status information in status register 328 to indicate the success and the number of retries performed by firmware 312.

If an acknowledge associated with the information has not been received, then the transaction fails as indicated in a block 416. Additional remedial action, such as logging the failure or notifying a system administrator may be performed in response to the function of block 416.

Figure 5:
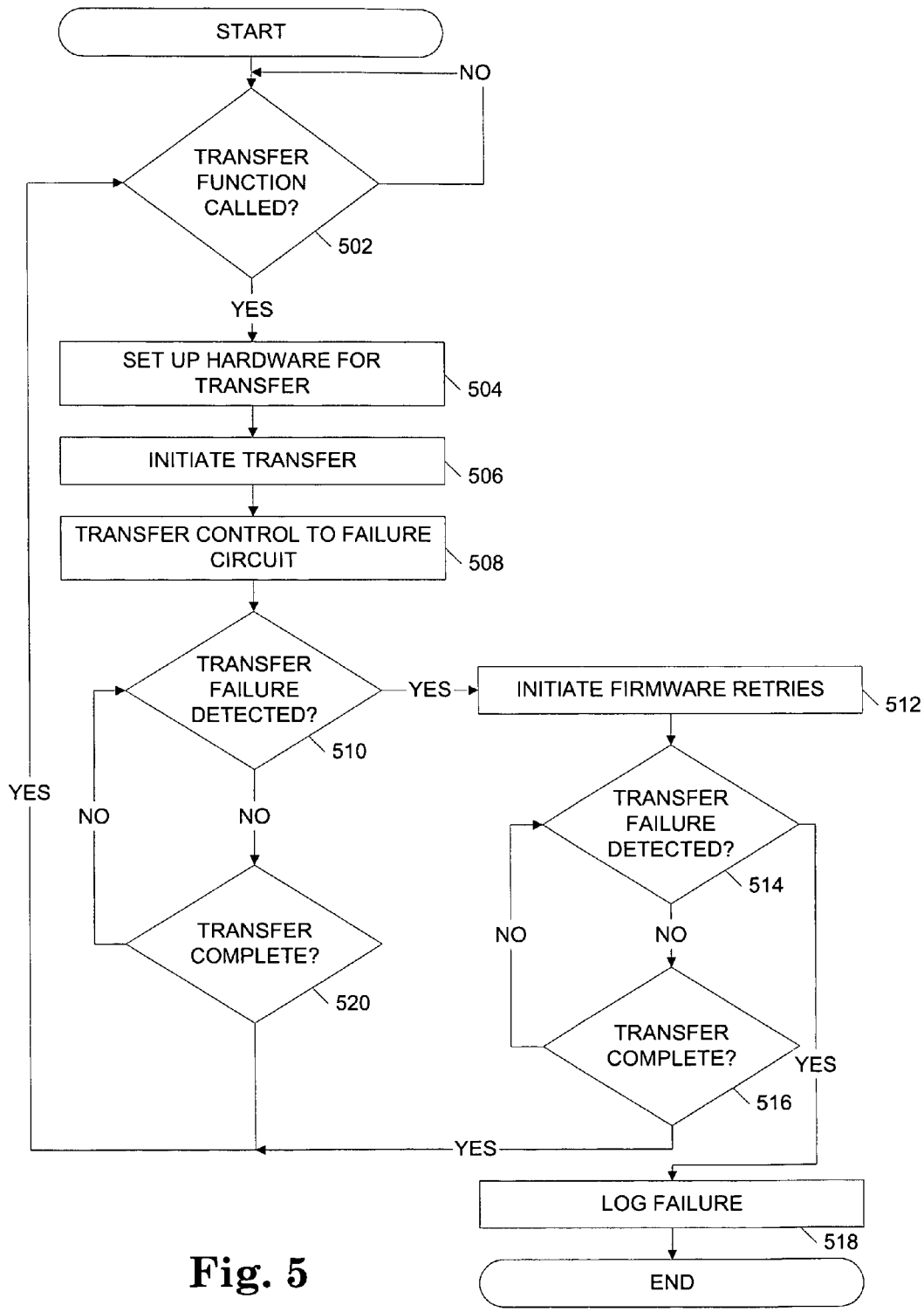
FIG. 5 is a flow chart illustrating an embodiment of a method for transferring information to a management system using firmware.

FIG. 5 is a flow chart illustrating an embodiment of a method for transferring information to management system 20 using firmware 312. In FIG. 5, a determination is made by firmware 312 as to whether a transfer function has been called as indicated in a block 502. The function call is received by controller 128, as noted above, and processor 300 causes the function to be executed in response to the function call being received. The function abstracts one or more of the ports 330 from operating system 132 and application 134. Operating system 132 and application 134 may select a port 330 to be used by calling a function specific to that port 330 or by providing a port indicator as a parameter as part of the function call. If operating system 132 and application 134 do not specify a port 330, firmware 312 may select a port 330 according to port setting in settings 314 or may determine the best available port according to the type of transfer. The port settings may also indicate an order of us for ports 330.

In response to the function being executed, firmware 312 causes hardware to be set up for the transfer as indicated in a block 504. Firmware 312 may cause the hardware to be set up by clearing a transaction counter 324 associated with a port 330 to be used, storing a retry indicator in control register 326 to indicate to failure circuit 322 whether to retry or abort the transfer, and storing a maximum number of retries indicator in control register 326.

Firmware 312 causes the transfer of information to be initiated as indicated in a block 506. In response to firmware 312 initiating the transfer, processor 300 causes the information to be provided from controller 128 to management system 20 using interface 320. Firmware 312 also transfers control of the transfer to failure circuit 322. The function of failure circuit 322 subsequent to the transfer control is described below with reference to FIG. 6. Firmware 312 may regain control of the transfer from failure circuit 322 in response to a signal from failure circuit 322 or in response to periodically polling data in status register 328.

A determination is made be firmware 312 as to whether a transfer failure has been detected by failure circuit 322 as indicated in a block 510. Firmware 312 may detect a transfer failure state in response to detecting a value of the success/failure indicator in status register 328 stored by failure circuit 322 that indicates that the transfer has failed: If a transfer failure has not been detected, then a determination is made as to whether the transfer is complete as indicated in a block 520. Firmware 312 may detect a transfer complete state in response to detecting that an acknowledge has been received by interface 320 from management system 20 or in response to detecting that a value of the success/failure indicator in status register 328 stored by failure circuit 322 that indicates that the transfer has succeeded. If the transfer is complete, then the function of block 502 is repeated at a later time. If the transfer is not complete, then the function of block 510 is repeated at a later time.

If a transfer failure has been detected, then firmware 312 causes firmware retries to be initiated as indicated in a block 512. Firmware 312 may continuously or periodically cause the transfer to be retried using one or more ports 330. If a port 330 catastrophically fails, possibly due to a hardware error in management system 20, then firmware 312 may select another port in which to retry the transfer according to port information in settings 314.

A determination is made be firmware 312 as to whether a transfer failure has been detected as indicated in a block 514. Firmware 312 may detect a transfer failure state by determining that a maximum number of retries has been exceeded for one or more ports 330. Firmware 312 may use transaction counters 324 and control register 326 to make this determination, or firmware 312 may use other information generated by firmware 312 to make this determination. If a transfer failure has not been detected, then a determination is made as to whether the transfer is complete as indicated in a block 516. Firmware 312 may detect a transfer complete state in response to detecting that an acknowledge has been received by interface 320 from management system 20 or in response to detecting that a value of the success/failure indicator in status register 328 stored by failure circuit 322 or processor 300 that indicates that the transfer has succeeded.

If the transfer is complete, then the function of block 502 is repeated at a later time. If the transfer is not complete, then the function of block 514 is repeated at a later time. If a transfer failure has been detected, then firmware 312 causes the failure to be logged as indicated in a block 518. Firmware 312 may cause the failure to be logged by storing data in status register 328 or by providing an indicator to processor 300. The functions of blocks 514 and 516 may be continuously or periodically repeated during the firmware retry process.

Figure 6:
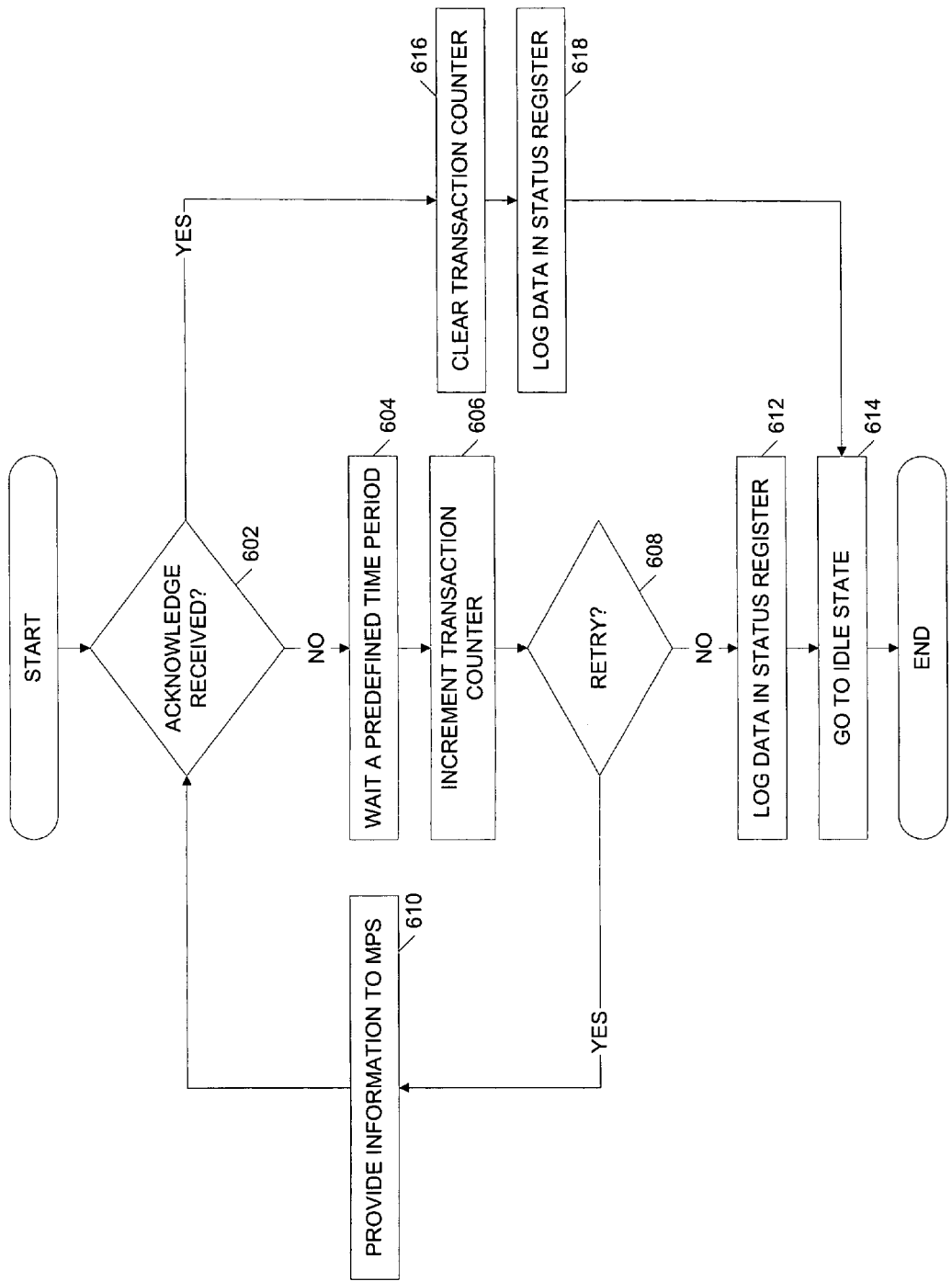
FIG. 6 is a flow chart illustrating an embodiment of a method for transferring information to a management system using a failure circuit.

FIG. 6 is a flow chart illustrating an embodiment of a method for transferring information to management system 20 using failure circuit 322. In FIG. 6, a determination is made by failure circuit 322 as to whether an acknowledge has been received as indicated in a block 602. If an acknowledge has not been received, then failure circuit 322 waits a predefined time period as indicated in a block 604. Failure circuit 322 increments a transaction counter 324 associated with the port 330 being used as indicated in a block 606.

A determination is made by failure circuit 322 as to whether failure circuit 322 should retry the transfer as indicated in a block 608. Failure circuit 322 makes this determine according to failure information in transactions counters 324, control register 326, and status register 328. In particular, failure circuit 322 accesses a retry indicator in control register 326. The retry indicator comprises either a first value that indicates that the transaction should be retried or a second value that indicates that the transaction should be aborted, i.e., not retried. If the retry indicator indicates that the transaction should be retried, then failure circuit 322 accesses a counter value in transaction counters 324 associated with the port 330 used by the transaction and compares the counter value to a maximum number of retries value in control register 326. If the counter value is less than or equal to the maximum number of retries value, then failure circuit 322 determines that the transaction should be retried. If either the retry indicator indicates abort or the counter value is greater than to the maximum number of retries value, then failure circuit 322 determines that the transaction should not be retried.

If failure circuit 322 determines that the transaction should be retried, then failure circuit 322 causes the information to be provided to management system 20 as indicated in a block 610. The function of block 610 occurs at a time subsequent to the time that information was originally provided to management system 20 by the function of block 404. The function of block 602 is then repeated.

If failure circuit 322 determines that the transaction should not be retried, then failure circuit 322 logs data associated with the transaction in status register 328 as indicated in a block 612. The data includes a failure indicator and a number of retries that failure circuit 322 performed in attempting to provide the information to management system 20. Failure circuit 322 causes controller 128 to enter an idle state as indicated in a block 614.

If an acknowledge associated with the transaction is received from management system 20 either before or after failure circuit 322 attempts to retry the transaction, then the transaction counter 324 associated with the port 330 being used for the transaction is cleared as indicated in a block 616. Failure circuit 322 or processor 300 logs data associated with the transaction in status register 328 as indicated in a block 618. The data includes a success indicator and a number of retries that failure circuit 322 performed in attempting to provide the information to management system 20. Failure circuit 322 or processor 300 causes controller 128 to enter an idle state as indicated in a block 618.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A computer system comprising:
   a controller comprising an interface and a failure circuit; and
   a management system coupled to the controller;
   wherein the controller is configured to provide first information to the management system at a first time using the interface, wherein the failure circuit is configured to cause the first information to be provided to the management system at a second time using the interface in response to an acknowledgement associated with the first information from the management system not being receiving at the interface, wherein the management system comprises a communication connection that is configured to provide an external agent with access to the computer system, wherein the management system is configured to provide second information associated with the computer system to the external agent, and wherein the second information comprises status information.

2. The computer system of claim 1 wherein the controller comprises third information, wherein the third information comprises failure information, and wherein the failure circuit is configured to cause the first information to be provided to the management system at the second time in response to the failure information.

3. The computer system of claim 1 wherein the controller comprises a transaction counter and a control register, wherein the failure circuit is configured to cause the first information to be provided to the management system at the second time in response comparing a first value stored in the transaction counter to a second value stored in the control register, and wherein the failure circuit is configured to increment the transaction counter in response to causing the first information to be provided to the management system at the second time.

4. The computer system of claim 3 wherein the failure circuit is configured to cause the first information to be provided to the management system at the second time in response a third value in the control register.

5. The computer system of claim 4 wherein the first value comprises a number of times that the first information has been provided to the management system, wherein the second value comprises a maximum number of retries, and wherein the third value comprises a retry indicator.

6. The computer system of claim 3 wherein the controller comprises a status register, and wherein the failure circuit is configured to cause data associated with the first information to be stored into the status register.

7. The computer system of claim 1 wherein the controller comprises a status register, and wherein the controller comprises a processor and firmware executable by the processor to cause the processor to store third information associated with the first information in the status register prior to the controller causing the first information to be provided to the management system.

8. The computer system of claim 7 wherein the firmware executable by the processor to cause the processor to cause controller to cause the first information to be provided to the management system.

9. The computer system of claim 1 wherein the controller comprises a first processor and firmware executable by the first processor to cause the first processor to cause the first information to be provided to the management system at a third time that is subsequent to the second time using the interface in response to an acknowledgement associated with the first information from the management system not being receiving at the interface.

10. The computer system of claim 9 further comprising:
a second processor; and
an application executable by the second processor to cause the second processor to provide a function call to the controller;
wherein the firmware comprises a function associated with the function call, and wherein the function is executable by the first processor to cause the first processor to cause the controller to cause the first information to be provided to the management system at the first time using the interface in response to the controller receiving the function call.

11. The computer system of claim 10 wherein the function call specifies a port of the management system.

12. A method performed by a controller in a computer system where the controller is coupled to a management system, the method comprising:
sending first information to the management system at a first time, wherein the management system includes a communication connection that is configured to provide an external agent with access to the computer system and wherein the management system is configured to provide second information that includes status information to the external agent;
sending the first information to the management system at a second time subsequent to the first time using a failure circuit in response to an acknowledge associated with the first information not being received by the controller; and
sending the first information to the management system at a third time subsequent to the second time using firmware executable by the controller in response to the acknowledge associated with the first information not being received by the controller.

13. The method of claim 12 further comprising:
sending the first information to the management system at the first time in response to executing a function in the firmware.

14. The method of claim 12 further comprising:
sending the first information to the management system at the second time subsequent to the first time using the failure circuit in response to the failure circuit determining that the acknowledge associated with the first information not being received by the controller.

15. The method of claim 12 further comprising:
sending the first information to the management system at the second time subsequent to the first time using the failure circuit in response to the failure circuit determining a maximum number of retries associated with the first information has not been exceeded.

16. The method of claim 12 further comprising:
sending the first information to the management system at the third time subsequent to the second time using firmware executable by the controller in response to the firmware determining that the acknowledge associated with the first information not being received by the controller.

17. The method of claim 12 further comprising:
sending the first information to the management system at the third time subsequent to the second time using firmware executable by the controller in response to the firmware determining a maximum number of retries associated with the first information has not been exceeded.

18. A computer system comprising:
a first processor;
a memory coupled to the first processor and comprising an application;
a controller comprising a failure circuit, a second processor, and firmware executable by the second processor; and
a management system coupled to the controller;
wherein the application is configured to cause the first processor to call a function in the firmware, wherein the function is executable by the second processor to cause a information to be transferred to the management system at a first time, wherein the failure circuit is configured to cause the information to be transferred to the management system at a second time subsequent to the first time in response to determining that an acknowledge associated with the information has not been received by the controller, and wherein the firmware is executable by the second processor to cause the second processor to cause the information to be transferred to the management system at a third time subsequent to the second time in response to determining that the acknowledge associated with the information has not been received by the controller.

19. The computer system of claim 18 wherein the controller comprises a transaction counter and a control register, and wherein the failure circuit is configured to cause the information to be transferred to the management system at the second time in response to determining that a first value stored in the transaction counter is less than a second value stored in the control register.

20. The computer system of claim 19 wherein the failure circuit is configured to cause the transaction counter to be incremented in response to causing the information to be transferred to the management system at the second time.

21. The computer system of claim 18 wherein the controller comprises a status register, and wherein the failure circuit is configured to cause the information to be transferred to the management system at the second time in response to determining that a first value stored in the status register is a retry indicator.

22. The computer system of claim 18 wherein the firmware is executable by the second processor to cause the second processor to cause the information to be transferred to the management system at the third time in response to determining that a maximum number of retries associated with the information has not been exceeded.

23. The computer system of claim 18 wherein the function is executable by the second processor to cause the information to be transferred to a first port of the management system at the first time, wherein the firmware is executable by the second processor to cause the second processor to cause the information to be transferred to the first port of the management system at the third time, and wherein the firmware is executable by the second processor to cause the second processor to cause the information to be transferred to a second port of the management system at a fourth time subsequent to the third time in response to determining that the acknowledge associated with the information has not been received by the controller.

* * * * *

UNITED STATES PATENT AND TRADEMARK OFFICE
CERTIFICATE OF CORRECTION

PATENT NO. : 7,234,083 B2 Page 1 of 1
APPLICATION NO. : 10/739758
DATED : June 19, 2007
INVENTOR(S) : Sachin N. Chheda et al.

It is certified that error appears in the above-identified patent and that said Letters Patent is hereby corrected as shown below:

In column 2, line 67, delete "10(*n*)" and insert -- 110(*n*) --, therefor.

Signed and Sealed this

Fifth Day of August, 2008

JON W. DUDAS
*Director of the United States Patent and Trademark Office*